US012668544B2

(12) United States Patent
Masuda et al.

(10) Patent No.: US 12,668,544 B2
(45) Date of Patent: Jun. 30, 2026

(54) PASTE FOR CERAMIC 3D SHAPING AND METHOD FOR MANUFACTURING THREE-DIMENSIONAL SHAPED OBJECT

(71) Applicant: NIPPON ELECTRIC GLASS CO., LTD., Otsu (JP)

(72) Inventors: Noriaki Masuda, Otsu (JP); Masayuki Itadani, Otsu (JP)

(73) Assignee: NIPPON ELECTRIC GLASS CO., LTD., Otsu (JP)

( * ) Notice: Subject to any disclaimer, the term of this patent is extended or adjusted under 35 U.S.C. 154(b) by 956 days.

(21) Appl. No.: 17/619,301

(22) PCT Filed: Jun. 26, 2020

(86) PCT No.: PCT/JP2020/025263
§ 371 (c)(1),
(2) Date: Dec. 15, 2021

(87) PCT Pub. No.: WO2021/006071
PCT Pub. Date: Jan. 14, 2021

(65) Prior Publication Data
US 2022/0402822 A1 Dec. 22, 2022

(30) Foreign Application Priority Data

Jul. 5, 2019 (JP) ................................. 2019-125908
Sep. 12, 2019 (JP) ................................. 2019-166186

(51) Int. Cl.
*C04B 35/117* (2006.01)
*B01D 39/20* (2006.01)
(Continued)

(52) U.S. Cl.
CPC ........ *C04B 35/117* (2013.01); *B01D 39/2006* (2013.01); *B01D 39/2072* (2013.01);
(Continued)

(58) Field of Classification Search
CPC ............... C04B 35/117; C04B 35/6269; C04B 35/63424; C04B 35/638; C04B 35/64;
(Continued)

(56) References Cited

U.S. PATENT DOCUMENTS 4,772,346 A * 9/1988 Anderson, Jr. ..... C04B 35/6325
501/153
5,275,889 A 1/1994 Yokouchi et al.
(Continued)

FOREIGN PATENT DOCUMENTS

CN 105102099 A 11/2015
CN 109133691 A * 1/2019
(Continued)

OTHER PUBLICATIONS

JP-2016164253-A machine translation (Year: 2016).*
(Continued)

*Primary Examiner* — Cameron K Miller
(74) *Attorney, Agent, or Firm* — Faegre Drinker Biddle & Reath LLP

(57) ABSTRACT

A paste for ceramic 3D shaping according to the present invention is a paste for ceramic 3D shaping containing a curable resin and inorganic particles, in which the inorganic particles contain ceramic particles and glass particles.

9 Claims, 7 Drawing Sheets

(51) Int. Cl.

| | |
|---|---|
| *B28B 1/00* | (2006.01) |
| *B28B 11/24* | (2006.01) |
| *B33Y 10/00* | (2015.01) |
| *B33Y 70/10* | (2020.01) |
| *C04B 35/626* | (2006.01) |
| *C04B 35/634* | (2006.01) |
| *C04B 35/638* | (2006.01) |
| *C04B 35/64* | (2006.01) |
| *C04B 38/06* | (2006.01) |
| *B33Y 80/00* | (2015.01) |

(52) U.S. Cl.
CPC ............ *B28B 1/001* (2013.01); *B28B 11/243* (2013.01); *B33Y 10/00* (2014.12); *B33Y 70/10* (2020.01); *C04B 35/6269* (2013.01); *C04B 35/63424* (2013.01); *C04B 35/638* (2013.01); *C04B 35/64* (2013.01); *C04B 38/067* (2013.01); *B01D 2239/10* (2013.01); *B33Y 80/00* (2014.12); *C04B 2235/3217* (2013.01); *C04B 2235/365* (2013.01); *C04B 2235/6026* (2013.01)

(58) Field of Classification Search
CPC ...... C04B 2235/3217; C04B 2235/365; C04B 2235/6026; B01D 39/2006; B01D 39/2072; B28B 1/001; B28B 11/243
See application file for complete search history.

(56) References Cited

U.S. PATENT DOCUMENTS

| | | | |
|---|---|---|---|
| 5,277,946 A | 1/1994 | Nagai et al. | |
| 2016/0038866 A1 | 2/2016 | Gibson et al. | |
| 2017/0137327 A1* | 5/2017 | Capobianco .......... | C04B 35/486 |
| 2019/0112222 A1 | 4/2019 | Kanbara | |
| 2020/0276528 A1 | 9/2020 | Gibson et al. | |

FOREIGN PATENT DOCUMENTS

| | | | |
|---|---|---|---|
| CN | 109311734 A | | 2/2019 |
| JP | H03-237036 A | | 10/1991 |
| JP | 2003-344433 A | | 12/2003 |
| JP | 2005-353586 A | | 12/2005 |
| JP | 2006-257323 A | | 9/2006 |
| JP | 4556624 B2 | | 10/2010 |
| JP | 2016-521195 A | | 7/2016 |
| JP | 2016164253 A | * | 9/2016 |
| JP | 2017007921 A | * | 1/2017 |
| JP | 2018-062447 A | | 4/2018 |
| WO | WO-2001/073511 A1 | | 10/2001 |

OTHER PUBLICATIONS

JP-2017007921-A machine translation (Year: 2017).*
https://www.syalons.com/2023/05/25/what-is-alpha-sialon/#:~:text=Ceramics%20play%20an%20important%20role,interesting%20properties%20is%20alpha%2Dsialon Accessed Dec. 11, 2024 (Year: 2024).*
CN109133691A machine translation (Year: 2019).*
Second Chinese Office Action issued Nov. 2, 2022 in Chinese Patent Application No. 202080049355.3 with English-language translation.
International Search Report mailed Aug. 25, 2020 for PCT/JP2020/025263.
Written Opinion of the International Searching Authority mailed Aug. 25, 2020 for PCT/JP2020/025263.
First Office Action issued Jul. 6, 2022 in Chinese Patent Application No. 202080049355.3 (8 pages) with an English translation.
Japanese Office Action issued Feb. 15, 2023 in Japanese Patent Application No. 2019-166186, with English-language translation.
Japanese Office Action issued Jun. 21, 2023 in Application No. 2019-166186.
Extended European Search Report issued Jun. 26, 2023 in Application No. 20837800.0.

\* cited by examiner

PASTE FOR CERAMIC 3D SHAPING AND METHOD FOR MANUFACTURING THREE-DIMENSIONAL SHAPED OBJECT

TECHNICAL FIELD

The present invention relates to a paste for ceramic 3D shaping and a method for manufacturing a three-dimensional shaped object using the paste.

BACKGROUND ART

As a method for obtaining a three-dimensional shaped object by laminating a resin material or the like, for example, various methods such as a stereolithography method, a powder bed fusion (PBF) method, and a fused deposition modeling (FDM) method have been proposed and put into practical use.

In recent years, research and development of a ceramic 3D shaping method using not only a resin material but also ceramics as a material have been advanced. In the ceramic 3D shaping method, it is possible to obtain a three-dimensional shaped object having a complicated shape which is difficult to obtain by a manufacturing method of related art using a mold.

In the ceramic 3D shaping method, for example, a three-dimensional shaped object is produced as follows. First, a paste in which a ceramic material and a curable resin are mixed is prepared, and a uniform thickness is obtained on a stage for shaping using a coater or the like. Thereafter, the curable resin on the stage for shaping is irradiated with an active energy ray to form a cured layer having a desired pattern. After one layer of the cured layer is formed in this manner, the stage for shaping is lowered by one layer, an uncured paste is introduced onto the cured layer, and a new cured layer is laminated on the cured layer in the same manner. After the operation is repeated, the uncured paste is removed to obtain a precursor of the three-dimensional shaped object. Thereafter, the obtained precursor is degreased and sintered by firing to obtain a three-dimensional shaped object (see, for example, Patent Literature 1).

CITATION LIST

Patent Literature

Patent Literature 1: JP-A-2006-257323

SUMMARY OF INVENTION

Technical Problem

Patent Literature 1 proposes a shaping resin composition in which a ceramic filling rate is increased by using a ceramic powder having a small particle size as a material of a ceramic sintered body having sufficient strength.

However, even when such a material as described above is used, depending on a shape of the three-dimensional shaped object, there is a problem in that a crack is generated in the three-dimensional shaped object which is a final product, and consequently, a decrease in strength is caused.

An object of the present invention is to provide a paste for ceramic 3D shaping and a method for manufacturing a three-dimensional shaped object using the paste, which can give a three-dimensional shaped object in which a crack is less likely to occur.

Solution to Problem

As a result of intensive experiments by the present inventors, the present inventors have found that the above problems can be solved by providing glass particles in a paste for ceramic 3D shaping, and have proposed the present invention.

Here, the mechanism of crack generation and prevention can be assumed as follows. A crack of the three-dimensional shaped object occurs mainly in a firing step of a precursor. The firing step is generally performed by a two-step firing of degreasing and sintering. Specifically, as a degreasing step, the temperature is raised to a temperature at which a curable resin can be decomposed, and the curable resin is removed from the precursor. Next, as a sintering step, the temperature is raised to a sintering temperature of ceramic particles and the ceramic particles are sintered to obtain a three-dimensional shaped object. The crack is considered to occur due to separation between the ceramic particles for some reason in the series of firing steps.

However, since the paste for ceramic 3D shaping according to the present invention contains glass particles as an essential component in addition to a curable resin and ceramic particles which are generally contained, it is considered that spaces between the ceramic particles which may cause a crack can be filled with the softened and fluidized glass, and as a result, it is possible to prevent the crack of the three-dimensional shaped object.

That is, the paste for ceramic 3D shaping according to the present invention is a paste for ceramic 3D shaping containing a curable resin and inorganic particles, in which the paste for ceramic 3D shaping contains ceramic particles and glass particles as essential components as the inorganic particles.

In the present invention, the term "three-dimensional shaped object" refers to a three-dimensional shaped object formed of an inorganic substance that does not substantially contain an organic substance such as a curable resin.

In the paste for ceramic 3D shaping according to the present invention, glass particles/(ceramic particles+glass particles) is, in volume ratio, preferably 0.01 to 0.5.

By doing so, it is possible to improve the crack prevention effect. Glass particles/(ceramic particles+glass particles) is a value obtained by dividing the content of the glass particles represented by vol % by the total content of the ceramic particles and the glass particles.

In the paste for ceramic 3D shaping according to the present invention, the content of the inorganic particles is preferably 15 vol % or more.

This makes it easy to improve the strength of the three-dimensional shaped object.

In the paste for ceramic 3D shaping according to the present invention, the content of the ceramic particles is preferably 10 vol % or more.

This makes it easy to obtain a precursor of the three-dimensional shaped object suitable for sintering. In addition, it is easy to improve the strength of the three-dimensional shaped object.

In the paste for ceramic 3D shaping according to the present invention, the glass particles have a softening point of preferably 550° C. to 1200° C.

It is considered that the softening point of the glass affects the behavior of the glass particles during the firing of the precursor. By regulating the softening point of the glass particles within the above range, the glass particles are softened and fluidized at an appropriate timing in the firing process, and a homogeneous three-dimensional shaped object without a crack can be easily obtained. The softening point is a temperature at a fourth inflection point measured by a macro differential thermal analyzer (DTA).

In the paste for ceramic 3D shaping according to the present invention, a glass composition of the glass particles preferably contains, in mass %, 10% to 60% of $SiO_2$, 0 to 15% of $Al_2O_3$, 0 to 50% of $B_2O_3$, 0 to 40% of ZnO, 0 to 30% of BaO, 0 to 25% of CaO, 0 to 20% of SrO, 0 to 7% of $Na_2O$, 0 to 2% of $K_2O$, 0 to 5% of $P_2O_5$, 0 to 3% of ZrO, and 0 to 5% of $F_2$.

In this case, a glass having a desired softening point can be easily obtained.

In the paste for ceramic 3D shaping according to the present invention, the curable resin is preferably a photo-curable resin.

A method for manufacturing a three-dimensional shaped object according to the present invention is a method for manufacturing a three-dimensional shaped object using the paste for ceramic 3D shaping. The method includes: irradiating the paste for ceramic 3D shaping with an active energy ray to cure the curable resin to obtain a precursor; and heat-treating the precursor to remove the curable resin and sinter the ceramic particles and the glass particles.

The three-dimensional shaped object according to the present invention is formed of a fired body of the paste for ceramic 3D shaping.

The three-dimensional shaped object according to the present invention is preferably a microplate.

The three-dimensional shaped object according to the present invention is preferably a filter.

The three-dimensional shaped object according to the present invention is formed of a sintered body of inorganic particles containing ceramic particles and glass particles, in which glass particles/(ceramic particles+glass particles) is, in volume ratio, 0.01 to 0.5.

Advantageous Effects of Invention

According to the present invention, it is easy to obtain a three-dimensional shaped object in which a crack is less likely to occur even in a complicated shape.

DESCRIPTION OF EMBODIMENTS

Figure 1:
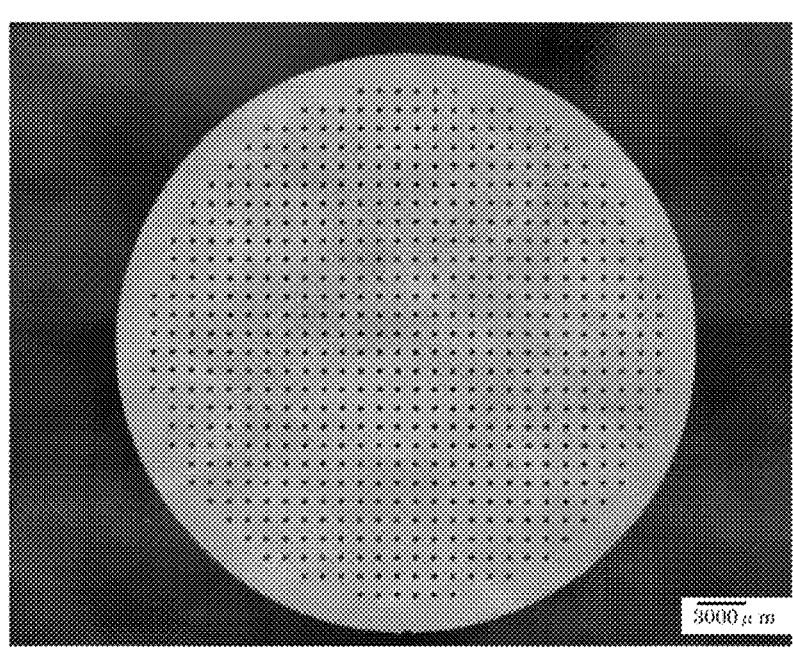
FIG. 1 is an appearance photograph of a three-dimensional shaped object.

A paste for ceramic 3D shaping according to the present invention contains a curable resin and inorganic particles.

The content of the inorganic particles in the paste for ceramic 3D shaping according to the present invention is, in vol %, preferably 15% or more, 20% to 90%, 25% to 75%, 30% to 70%, 35% to 65%, and particularly preferably 40% to 65%. This makes it easy to improve the strength of a three-dimensional shaped object. On the other hand, when the content of the inorganic particles is too large, the content of the curable resin in the paste becomes too small, and the fluidity may be deteriorated.

The paste for ceramic 3D shaping according to the present invention contains ceramic particles and glass particles as essential components as the inorganic particles. In the present invention, in order to clearly distinguish the "ceramic particles" and the "glass particles" in the paste for ceramic 3D shaping, the "ceramic particles" refer to particles formed of a non-metallic inorganic substance excluding glass, and the "glass particles" refer to particles formed of glass (including crystallized glass).

First, the ceramic particles according to the present invention will be described below.

The content of the ceramic particles in the paste is, in vol %, preferably 10% or more, 10% to 88%, 15% to 75%, 20% to 65%, 25% to 55%, and particularly preferably 30% to 45%. This makes it easy to improve the strength of the three-dimensional shaped object. On the other hand, when the content of the ceramic particles is too large, the content of the curable resin in the paste becomes too small, and the fluidity may be deteriorated.

An average particle diameter of the ceramic particles is preferably 5 μm or less, 0.01 μm to 3 μm, 0.05 μm to 2.5 μm, 0.08 μm to 2 μm, 0.1 μm to 1 μm, and particularly preferably 0.12 μm to 0.49 μm. When the average particle diameter of the ceramic particles is too large, the fluidity of the paste is deteriorated, and handling becomes difficult, or the sinterability is decreased, and three-dimensional shaping becomes difficult. In addition, it is difficult to increase a filling rate of the ceramic particles. On the other hand, when the average particle diameter of the ceramic particles is too small, the viscosity of the paste may be unduly increased, and the three-dimensional shaping may be difficult. In addition, the material cost is increased. In the present specification, the average particle diameter is a value ($D_{50}$) measured by a laser diffraction method.

A maximum particle diameter of the ceramic particles is preferably 15 μm or less, and is preferably 6 μm or less, 3 μm or less, 1 μm or less, and particularly preferably 0.9 μm or less. When the maximum particle diameter of the ceramic particles is too large, it becomes difficult to form an uncured layer having a uniform thickness or to form a thin layer in the manufacturing step of the three-dimensional shaped object. As a result, it is difficult to obtain a precise three-dimensional shaped object. In the present specification, the average maximum particle diameter is a value ($D_{99}$) measured by a laser diffraction method.

As a material of the ceramic particles, any material may be used depending on the application as long as the material can be three-dimensionally shaped. For example, one or more kinds selected from alumina, zirconia, aluminum nitride, silicon nitride, carbides such as silicon carbide, ferrite, and hydroxyapatite are preferable. From the viewpoint of availability and ease of forming, alumina, zirconia, aluminum nitride, and silicon nitride are particularly preferable.

In addition, in the paste for ceramic 3D shaping according to the present invention, ceramics other than the materials described above can be appropriately added as the ceramic particles in order to impart desired characteristics. For example, since titanium oxide based ceramics have ultraviolet absorption performance, the ultraviolet transmittance of the paste can be easily controlled by adding the titanium oxide ceramics to the paste. Examples of the titanium oxide based ceramics include titania, barium titanate, and strontium titanate. In addition, cerium oxide based ceramics such as cerium oxide also have ultraviolet absorption performance and exhibit the same effects as titanium oxide based ceramics.

When titanium oxide based ceramics are contained as the ceramic particles, a value of titanium oxide based ceramics/(ceramic particles+glass particles) is, in vol %, preferably 0.001 to 0.1, 0.005 to 0.05, and 0.008 to 0.03. When titanium oxide based ceramics are added, the ultraviolet transmittance of the paste can be easily controlled, and a three-dimensional shaped object having a precise shape can be easily obtained. On the other hand, when the content of the titanium oxide based ceramics is too large, the ultraviolet absorbing ability of the paste is too high, and it is difficult for ultraviolet rays to reach a desired range, which may make it difficult to cure the portion. A preferable range and reason of the cerium oxide based ceramics are also the same as those of the titanium oxide based ceramics.

A shape of the ceramic particles is not particularly limited, and may be, for example, a true spherical shape, a substantially spherical shape, a go stone shape, a crushed shape, or a fibrous shape.

Next, the glass particles according to the present invention will be described below.

The glass particles according to the present invention preferably have a controlled softening point. In this way, in the firing step of the precursor, the glass particles are softened and fluidized in an appropriate temperature range, and the separation of the ceramic particles can be prevented. As a result, a crack of the three-dimensional shaped object can be effectively prevented. Specifically, the glass particles according to the present invention have a softening point of preferably 550° C. to 1200° C., 580° C. to 1180° C., 600° C. to 1150° C., 610° C. to 1100° C., and particularly preferably 620° C. to 1000° C. When the softening point of the glass particles is too low, the softening and fluidizing of the glass particles excessively occurs before the degreasing temperature of the precursor, a glass component is likely to be unevenly distributed, and there is a concern that it is difficult to prevent the crack of the three-dimensional shaped object. On the other hand, when the softening point of the glass particles is too high, the softening and fluidizing of the glass particles does not occur even at the sintering temperature of the ceramic particles, and as a result, it may be difficult to prevent the crack of the three-dimensional shaped object.

A ratio (volume ratio) of glass particles/(ceramic particles+glass particles) is preferably 0.01 to 0.5, 0.01 to 0.4, 0.01 to 0.35, 0.01 to 0.3, 0.01 to 0.25, 0.01 to 0.2, and particularly preferably 0.01 to 0.19. By doing so, it is possible to contain an appropriate amount of the glass particles with respect to the content of the ceramic particles, and it is easy to more accurately prevent the crack of the three-dimensional shaped object. On the other hand, when the ratio of the glass particles is too large, the content of the ceramic particles contained in the paste is relatively small, and thus the strength of the three-dimensional shaped object is likely to decrease.

Further, the content of the glass particles in the paste is, in vol %, preferably 0.01% to 50%, 0.1% to 40%, 0.5% to 30%, 1% to 25%, 1.5% to 20%, and particularly preferably 2% to 15%. This makes it easy to prevent the crack of the three-dimensional shaped object. On the other hand, when the content of the glass particles is too large, the content of the ceramic particles that can be contained in the paste is decreased, and thus the strength of the three-dimensional shaped object is likely to decrease.

An average particle diameter of the glass particles is preferably 7 $\mu$m or less, 0.01 $\mu$m to 5 $\mu$m, 0.1 $\mu$m to 3 $\mu$m, and particularly preferably 0.3 $\mu$m to 2 $\mu$m. When the average particle diameter of the glass particles is too large, the fluidity of the paste is deteriorated, and handling becomes difficult or three-dimensional shaping becomes difficult. On the other hand, when the average particle diameter of the glass particles is too small, the viscosity of the paste may be improperly increased. In addition, the material cost is increased.

A maximum particle diameter of the glass particles is preferably 20 $\mu$m or less, 15 $\mu$m or less, 8 $\mu$m or less, and particularly preferably 7 $\mu$m or less. When the maximum particle diameter of the glass particles is too large, it is difficult to form an uncured layer having a uniform thickness or to form a thin layer in the three-dimensional shaping step. As a result, it is difficult to obtain a precise three-dimensional shaped object.

A value of average particle diameter of glass particles/average particle diameter of ceramic particles is preferably 0.1 to 50, 0.5 to 30, 0.9 to 20, and particularly preferably 1 to 10. When the value is too small, the manufacturing cost of the glass particles may be increased. On the other hand, when the value is too large, it becomes difficult to appropriately dispose the glass particles between the ceramic particles, and it becomes difficult to prevent the crack of the three-dimensional shaped object.

A shape of the glass particles is not particularly limited, and may be, for example, a true spherical shape, a substantially spherical shape, a go stone shape, a crushed shape, or a fibrous shape. The spherical or substantially spherical glass particles (glass beads) can be produced by exposing the grinded glass particles against a burner flame or the like to form the particles.

A density of the glass particles is preferably 1 g/cm$^3$ to 8 g/cm$^3$, 1.5 g/cm$^3$ to 7 g/cm$^3$, and particularly preferably 2 g/cm$^3$ to 6 g/cm$^3$. When the density of the glass particles is too small, it is difficult to obtain a sense of profoundness of the three-dimensional shaped object. On the other hand, when the density of the glass particles is too high, the glass particles are likely to precipitate in the paste, and thus it is difficult to uniformly knead the paste.

A difference between the density of the glass particles and the density of the ceramic particles is preferably 5 g/cm$^3$ or less, 3 g/cm$^3$ or less, 2 g/cm$^3$ or less, and particularly preferably 1 g/cm$^3$. When the difference between the density of the glass particles and the density of the ceramic particles is too large, it is difficult to uniformly knead the ceramic particles and the glass particles.

Although the glass composition of the glass particles is not limited, for example, $SiO_2$—RO (R is an alkaline earth metal element) based glass, $SiO_2$—$B_2O_3$ based glass, $SiO_2$—R'$_2$O (R' is an alkaline metal element) based glass, $SiO_2$—$B_2O_3$—R'$_2$O based glass, $SiO_2$—$B_2O_3$—ZnO based glass, $SiO_2$—R'$_2$O—RO based glass, $SiO_2$—$Al_2O_3$—RO based glass, $SiO_2$—$Al_2O_3$—R'$_2$O—RO based glass, $SiO_2$—$Al_2O_3$—$B_2O_3$—R'$_2$O based glass, and $SiO_2$—$Al_2O_3$—$B_2O_3$—R'$_2$O—RO based glass can be used.

Here, typical examples of the glass composition are shown below, but it is apparent from the gist of the present application that the glass composition is not limited thereto. In the following description of the glass composition, "%" means mass % unless otherwise specified.

The glass composition of the glass particles preferably contains, in mass %, 10% to 60% of $SiO_2$, 0 to 15% of $Al_2O_3$, 0% to 50% of $B_2O_3$, 0 to 40% of ZnO, 0 to 30% of BaO, 0 to 25% of CaO, 0 to 20% of SrO, 0 to 7% of $Na_2O$, 0 to 2% of $K_2O$, 0 to 5% of $P_2O_5$, 0 to 3% of $ZrO_2$, and 0 to 5% of $F_2$.

$SiO_2$ is a component forming a glass network. $SiO_2$ is a component that can improve chemical durability and prevent devitrification. The content of $SiO_2$ is preferably 10% to 60%, more preferably 30% to 60%, and particularly preferably 40% to 60%. When the content of $SiO_2$ is too small, the chemical durability of the glass particles may be decreased or the vitrification may become difficult. On the other hand, when the content of $SiO_2$ is too large, the softening point may be unduly high.

$Al_2O_3$ is a vitrification stabilizing component and can be added for the purpose of improving the chemical durability and preventing the devitrification. The content of $Al_2O_3$ is preferably 0 to 15%, 0.1% to 15%, 0.5% to 15%, and more preferably 1% to 15%. When the content of $Al_2O_3$ is too large, the meltability may be lowered and the softening point may be unduly high.

$B_2O_3$ is a component forming a glass network, and can be added for the purpose of preventing the devitrification. The content of $B_2O_3$ is preferably 0 to 50%, 0 to 40%, 0 to 30%, and particularly preferably 0 to 28%. When the content of $B_2O_3$ is too large, the chemical durability may be deteriorated.

ZnO is a component that improves meltability. The content of ZnO is preferably 0 to 40%, 0 to 38%, 0 to 30%, 5 to 25%, and particularly preferably 5% to 28%. When the content of ZnO is too large, the chemical durability may be deteriorated.

BaO is a component that improves meltability. The content of BaO is preferably 0 to 30%, 5 to 28%, and particularly preferably 8 to 26%. When the content of BaO is too large, the chemical durability may be deteriorated.

CaO is a component that improves the meltability. The content of CaO is preferably 0 to 25%, 3% to 21%, and particularly preferably 4% to 20%. When the content of CaO is too large, the chemical durability may be deteriorated.

SrO is a component that improves the meltability. The content of SrO is preferably 0 to 20%, more preferably 0 to 19%, and particularly preferably 1% to 15%. When the content of SrO is too large, the chemical durability may be deteriorated.

In order to improve the meltability of the glass, MgO may be added. The content of MgO is preferably 0 to 20%, 0 to 10%, and particularly preferably 0 to 5%. When the content of MgO is too large, the chemical durability may be deteriorated.

$Na_2O$ is a component that reduces the viscosity of the glass and prevents the devitrification. The content of $Na_2O$ is preferably 0 to 7%, and more preferably 0 to 6%. When the content of $Na_2O$ is too large, the chemical durability may be deteriorated.

$K_2O$ is a component that reduces the viscosity of the glass and prevents the devitrification. The content of $K_2O$ is preferably 0 to 2%, and more preferably 0 to 1%. When the content of $K_2O$ is too large, the chemical durability may be deteriorated.

In addition to $Na_2O$ and $K_2O$, $Li_2O$ can also be added as the alkali metal oxide in order to reduce the viscosity of the glass. In this case, the content of $Li_2O$ is preferably 0 to 2%, and more preferably 0 to 1%. When the content of $Li_2O$ is too large, the chemical durability may be likely to decrease.

$P_2O_5$ is a component that stabilizes the vitrification and prevents the devitrification. The content of $P_2O_5$ is preferably 0 to 5%, and more preferably 0 to 3%. When the content of $P_2O_5$ is too large, the vitrification becomes unstable and the devitrification is likely to occur.

$ZrO_2$ is also a component that stabilizes the vitrification and prevents the devitrification. The content of $ZrO_2$ is preferably 0 to 3%, and more preferably 0 to 1%. When the content of $ZrO_2$ is too large, the vitrification becomes unstable, and the devitrification is likely to occur.

$F_2$ is a component that reduces the viscosity of the glass. The content of $F_2$ is preferably 0 to 5%, and more preferably 0 to 3%. When the content of $F_2$ is too large, the chemical durability may be deteriorated. Further, $F_2$ has high volatility, and there is a possibility that a component sublimated at the time of producing the glass beads is attached to the glass surface and the surface properties are deteriorated.

In addition to the above components, the glass particles according to the present application may contain, for example, $TiO_2$, $CeO_2$, $La_2O_3$, $Ta_2O_5$, $TeO_2$, $Nb_2O_5$, $WO_3$, $Gd_2O_3$, $Y_2O_3$, $CeO_2$, $Sb_2O_3$, $SnO_2$, $Bi_2O_3$, and $As_2O_3$ each in an amount of 10% or less, 5% or less, particularly 3% or less, and in a total amount of 20% or less, particularly 10% or less. Since $TiO_2$ and $CeO_2$ have ultraviolet absorption performance, the ultraviolet transmittance of the paste is easily controlled.

The surfaces of the glass particles are preferably treated with a silane coupling agent. When the glass particles are treated with the silane coupling agent, the affinity of the glass particles in the paste is improved, and bubbles and voids at the interface are likely to be reduced. Preferable examples of the silane coupling agent include aminosilane, epoxysilane, and acrylsilane. The silane coupling agent may be appropriately selected depending on the resin to be used. For example, when a vinyl based unsaturated compound is used as the photocurable resin, an acrylsilane based silane coupling agent is most preferable, and when an epoxy based compound is used, an epoxysilane based silane coupling agent is preferably used.

In the paste for ceramic 3D shaping according to the present invention, a difference between the thermal expansion coefficient of the glass particles at 30° C. to 300° C. and the thermal expansion coefficient of the ceramic particles at 30° C. to 300° C. is preferably within $\pm20\times10^{-7}/°$ C., more preferably within $+15\times10^{-7}/°$ C., and particularly preferably within $+10\times10^{-7}/°$ C. In this case, since the difference in thermal expansion between the glass particles and the ceramic particles is reduced, the crack of the three-dimensional shaped object can be prevented.

Furthermore, the thermal expansion coefficient of the glass particles at 30° C. to 300° C. is preferably $20\times10^{-7}/°$ C. to $100\times10^{-7}/°$ C., more preferably $30\times10^{-7}/°$ C. to $90\times10^{-7}/°$ C., and particularly preferably $40\times10^{-7}/°$ C. to $80\times10^{-7}/°$ C. The lower the thermal expansion coefficient is, the less likely the occurrence of crack or strength deterioration due to thermal shock. In addition, it is possible to obtain a three-dimensional shaped object having a small shrinkage rate at the time of curing or firing the paste and high dimensional accuracy.

Next, the curable resin according to the present invention will be described below.

The curable resin may be any of a photo-curable resin and a thermosetting resin, and may be appropriately selected in accordance with the shaping method to be adopted or the application of the three-dimensional shaped object. For example, in the case of using a stereolithography method in which curing is performed by irradiation with an active energy ray such as UV light (wavelength: 300 nm to 400 nm), a liquid photo-curable resin may be selected, and in the case of using a selective laser melting method, a thermosetting resin may be selected.

For example, as the photo-curable resin, various resins such as a polymerizable vinyl based compound and an epoxy based compound can be selected. Monomers and oligomers of monofunctional compounds and polyfunctional compounds are also used. The monofunctional compound and the polyfunctional compound are not particularly limited. For example, typical examples of the photo-curable resin are described below, but the present invention is not limited thereto.

Examples of the monofunctional compound of the polymerizable vinyl based compound include isobornyl acrylate, isobornyl methacrylate, zinc clopentenyl acrylate, bornyl acrylate, bornyl methacrylate, 2-hydroxyethyl acrylate, 2-hydroxypropyl acrylate, propylene glycol acrylate, vinylpyrrolidone, acrylamide, vinyl acetate, and styrene. Examples of the polyfunctional compound include trimethylolpropane triacrylate, EO-modified trimethylolpropane triacrylate, ethylene glycol diacrylate, tetraethylene glycol diacrylate, polyethylene glycol diacrylate, 1,4-butanediol diacrylate, 1,6-hexanediol diacrylate, neopentyl glycol diacrylate, dicyclopentenyl diacrylate, polyester diacrylate, and diallyl phthalate. One or more of these monofunctional compounds and polyfunctional compounds can be used alone or in the form of a mixture.

As a polymerization initiator of the vinyl based compound, a photopolymerization initiator and a thermal polymerization initiator are used. Typical examples of the photopolymerization initiator include 2,2-dimethoxy-2-phenylacetophenone, 1-hydroxycyclohexyl phenyl ketone, acetophenone, benzophenone, xanthone, fluorenone, benzaldehyde, fluorene, anthraquinone, triphenylamine, carbazole, 3-methylacetophenone, Michler's ketone. These initiators can be used alone or in combination of two or more. If necessary, a sensitizer such as an amine based compound may be used in combination. Typical examples of the thermal polymerization initiator include benzoyl peroxide, t-butyl peroxybenzoate, dicumyl peroxide, diisopropyl peroxydicarbonate, t-butyl peroxide, and azobisisobutyronitrile. The amount of the polymerization initiator or the thermal polymerization initiator to be used is preferably 0.1 weight % to 10 weight % with respect to the vinyl based compound.

Examples of the epoxy based compound include hydrogenated bisphenol A diglycidyl ether, 3,4-epoxycyclohexylmethyl-3,4-epoxycyclohexanecarboxylate, 2-(3,4-epoxycyclohexyl-5,5-spiro-3,4-epoxy)cyclohexane-m-dioxane, and bis(3,4-epoxycyclohexylmethyl)adipate. In the case of using these epoxy based compounds, an energy active cation initiator such as triphenylsulfonium hexafluoroantimonate can be used.

In the case of using the stereolithography method, a curable resin having a high transmittance in a wavelength region of the active energy ray can more efficiently manufacture a three-dimensional shaped object. Examples of such a curable resin include a vinyl resin, a polystyrene resin, an acrylic resin, a polyethylene terephthalate resin, a polycarbonate resin, a cellulose acetate resin, a polyolefin resin, a polysulfone resin, a polyether sulfone resin, a polyether imide resin, and a polyarylate resin.

Examples of the thermosetting resin include an epoxy resin, a thermosetting polyphenylene ether resin, a thermosetting polyimide resin, a urea resin, an allyl resin, a silicone resin, a benzoxazine resin, a phenol resin, an unsaturated polyester resin, a bismaleimide triazine resin, a modified maleimide resin, an alkyd resin, a furan resin, a melamine resin, a polyurethane resin, an aniline resin, and a guanamine resin.

In addition, a resin composition according to the present invention may contain various additive components, for example, additives such as a leveling agent, a surfactant, an organic polymer compound, an organic plasticizer, an antioxidant, a nucleating agent, a plasticizer, a release agent, a flame retardant, a pigment, carbon black, and an antistatic agent in an appropriate amount as long as the object of the present invention is not impaired. In addition, in order to prevent aggregation of the powder, a dispersant may be appropriately used.

The decomposition temperature of the curable resin used in the present invention is preferably 550° C. or lower, 500° C. or lower, and particularly preferably 450° C. or lower. When the decomposition temperature of the curable resin is too high, the curable resin is less likely to be removed by the degreasing processing, and thus the resulting three-dimensional shaped object tends to have poor denseness.

The viscosity of the curable resin at 25° C. is preferably 10 Pa·s or less, 5 Pa·s or less, and particularly preferably 1 Pa·s or less. In this case, even when the inorganic particles are contained, the viscosity is not likely to be unduly increased, and thus the inorganic particles can be contained at a high concentration. The viscosity is a value measured with a B-type viscometer at 25° C. and 10 rpm.

Next, an example using a stereolithography method will be described as an example of a method for manufacturing a three-dimensional shaped object according to the present invention.

First, a 3D paste for ceramic 3D shaping is prepared. The paste for ceramic 3D shaping can be obtained by mixing and kneading a curable resin, ceramic particles, and glass particles at any ratio. The kneading method is not limited, and for example, a ball mill, a planetary centrifugal mixer, or a three-roll mill can be used alone or in combination. After kneading, filtration may be performed using a mesh pass as necessary.

The viscosity of the 3D paste for ceramic 3D shaping at 25° C. is preferably 20 Pa·s to 300 Pa·s, 20 Pa·s to 200 Pa·s, and particularly preferably 40 Pa·s to 180 Pa·s. In this case, the fluidity of the paste is improved, handling is facilitated, and three-dimensional shaping is facilitated.

Next, one uncured layer formed of the paste for ceramic 3D shaping is formed using a ceramic 3D shaping device. For example, a stage for shaping is provided, and the paste for ceramic 3D shaping is uniformly applied thereon to a thickness of about 50 μm using a coater or the like to form an uncured layer.

Next, the uncured layer is irradiated with an active energy ray, for example, an ultraviolet laser to cure the photo-curable resin, thereby forming a cured layer having a predetermined pattern. As the active energy ray, a laser beam such as a visible ray or an infrared ray can be used in addition to ultraviolet rays.

Subsequently, a new uncured layer formed of the paste for ceramic 3D shaping is prepared on the formed cured layer. For example, a new uncured layer can be prepared by lowering the stage for shaping by one layer and further applying a paste onto the formed cured layer.

Thereafter, a new uncured layer prepared on the cured layer is irradiated with an active energy ray to form a new cured layer continuous with the cured layer.

After repeating the above operation, the uncured paste is removed by washing to obtain a precursor of the three-dimensional shaped object.

Next, the resulting precursor is subjected to a heat treatment to remove the curable resin, and the ceramic particles and the glass particles are sintered. First, it is preferable that the precursor is heat-treated (degreased) at the decomposition temperature of the curable resin, then further the temperature is increased, and the precursor is heat-treated (sintered) at the sintering temperature (two-step sintering). In this case, the curable resin is easily removed from the precursor, and the denseness of the sintered body is easily improved. Degreasing is performed at the decomposition temperature of the curable resin described above. When the sintering temperature is too low, the sintering becomes insufficient, and the denseness of the sintered body is likely to decrease. On the other hand, when the heat treatment temperature in the sintering step is too high, the thermal shrinkage becomes large, and it becomes difficult to obtain a three-dimensional shaped object having a desired shape.

The atmosphere in the degreasing step in the method for manufacturing a three-dimensional shaped object according to the present invention is not particularly limited to a reduced-pressure atmosphere (less than 1 atm ($1.013 \times 10^5$ Pa)), an air atmosphere, an oxygen atmosphere, a nitrogen atmosphere, or the like, but from the viewpoint of efficient degreasing, an air atmosphere containing a certain amount of oxygen or an oxygen atmosphere is preferable.

In addition, in the sintering step, it is preferable to select an optimal atmosphere depending on the kind of the ceramic. For example, an oxide based ceramic such as alumina or zirconia is preferably selected under an air atmosphere or an oxygen atmosphere, and a nitride based ceramic such as aluminum nitride or silicon nitride is preferably selected under a nitrogen atmosphere. In addition, it is preferable to optimize the sintering temperature, the sintering time, and the temperature rising and lowering speed in accordance with the shape, the size, and the like of the three-dimensional shaped object.

Next, the three-dimensional shaped object according to the present invention will be described with reference to an example.

An example of the three-dimensional shaped object according to the present invention is a microplate.

The microplate is a sheet-shaped member having plural minute cavities on a surface thereof, and is an experimental or testing instrument mainly used in biochemical analysis or the like. At present, as a material of the microplate, a resin is mainly used, which has a problem in terms of heat resistance and returnability. Therefore, in order to solve these problems, a microplate formed of ceramics may be considered, but in particular, when the diameter of the cavity is small, it is difficult to precisely form a hole.

In the three-dimensional shaped object according to the present invention, for example, since the minute cavity can be shaped by a stereolithography method, it is not necessary to form a hole. In addition, since the crack is less likely to occur in the three-dimensional shaped object according to the present invention, the three-dimensional shaped object can be suitably used for an experimental and inspection instrument.

The three-dimensional shaped object according to the present invention preferably contains titanium oxide based ceramics as the ceramic particles. A value of titanium oxide based ceramics/total ceramics particles is, in vol %, preferably 0.001 to 0.1, 0.005 to 0.05, and 0.008 to 0.03. When titanium oxide based ceramics are contained in the three-dimensional shaped object, antibacterial properties, antifouling properties, and antifungal properties can be imparted.

The microplate preferably has a thickness of 100 μm or less, 80 μm or less, 60 μm or less, or 40 μm or less. This makes it easy to obtain a thin microplate.

Plural cavities may be provided in the microplate as necessary. For example, the number of cavities of the microplate is 2 or more, 5 or more, 10 or more, 50 or more, 100 or more, 1000 or more, or 10000 or more. The larger the number of cavities of the microplate, the more culture can be performed at a time.

The diameter of the cavity of the microplate is preferably 80 μm or less, 70 μm or less, 60 μm or less, 50 μm or less, 40 μm or less, or 30 μm or less. As the diameter of the cavity of the microplate is smaller, a larger number of cavities can be provided in the microplate having the same area.

Furthermore, the pitch of the cavities of the microplate is preferably 200 μm or less, 180 μm or less, 160 μm or less, 130 μm or less, or 100 μm or less. As the pitch of the cavities of the microplate is smaller, a larger number of cavities can be provided in the microplate having the same area.

Another example of the three-dimensional shaped object according to the present invention is a ceramic filter.

The ceramic filter is a long ceramic filtration device having a large number of holes, and is generally used for drainage treatment, separation and concentration of raw materials, and the like. In the three-dimensional shaped object according to the present invention, for example, a complicated hole having a fine and spiral shape and the like can be formed by a stereolithography method, and thus a high-performance ceramic filter can be obtained. In addition, the three-dimensional shaped object according to the present invention has high reliability as a ceramic filter because the crack is less likely to occur.

Plural holes can be provided in the ceramic filter depending on the intended use. For example, the number of holes is preferably 20 or more, 50 or more, 100 or more, 500 or more, 1000 or more, 10000 or more, or 100000 or more.

The diameter of pores of the ceramic filter is preferably 80 μm or less, 70 μm or less, 60 μm or less, 50 μm or less, 40 μm or less, or 30 μm or less. As the diameter of the pores of the ceramic filter is smaller, more holes can be provided in a sectional area, and a ceramic filter having high performance can be obtained.

Furthermore, the pitch of the holes of the ceramic filter is preferably 200 μm or less, 180 μm or less, 160 μm or less, 130 μm or less, or 100 μm or less. As the pitch of the holes is smaller, a larger number of holes can be formed in the sectional area, and a high-performance ceramic filter can be obtained.

The three-dimensional shaped object according to the present invention is formed of a sintered body of inorganic particles containing ceramic particles and glass particles, and glass particles/(ceramic particles+glass particles) is, in volume ratio, preferably 0.01 to 0.5, 0.01 to 0.4, 0.01 to 0.35, 0.01 to 0.3, 0.01 to 0.25, 0.01 to 0.2, and particularly preferably 0.01 to 0.19. Since the three-dimensional shaped object according to the present invention contains glass particles in an appropriate amount with respect to the content of the ceramic particles, it is easy to obtain a three-dimensional shaped object without a crack. In addition, since the firing temperature of the three-dimensional shaped object can be lowered, a reduction in manufacturing cost can be expected.

The preferred ranges and reasons of the ceramic particles and the glass particles with respect to the three-dimensional shaped object according to the present invention are as described above, and the description thereof is omitted here.

Example

Hereinafter, the present invention will be described based on examples.

Table 1 shows glass particles according to the present invention.

TABLE 1

|  |  | No. 1 | No. 2 | No. 3 | No. 4 | No. 5 |
|---|---|---|---|---|---|---|
| Glass composition | $SiO_2$ | 35 | 50 | 50 | 50 | 10 |
| (mass %) | $Al_2O_3$ | 3 | 6 | 12.5 | 4 | 1.1 |
|  | $B_2O_3$ | 25 | 5 | — | 1.5 | 45 |
|  | ZnO | 17 | 2 | — | — | 35 |
|  | BaO | 12.5 | 25 | 10 | 18 | — |
|  | CaO | — | 12 | 19.5 | 6 | — |
|  | SrO | — | — | 5 | 19 | — |
|  | $Na_2O$ | 5.5 | — | — | — | 6.9 |
|  | $K_2O$ | 0.5 | — | — | — | — |
|  | $Li_2O$ | — | — | — | — | 2 |
|  | $P_2O_5$ | — | — | 3 | — | — |
|  | $ZrO_2$ | — | — | — | 1.5 | — |
|  | $F_2$ | 1.5 | — | — | — | — |
| Softening point (° C.) |  | 625 | 850 | 930 | 880 | 560 |
| Density (g/cm³) |  | 2.7 | 3.1 | 2.9 | 3.2 | 2.9 |
| Thermal expansion coefficient ($\times 10^{-7}$/° C.) |  | 63 | 68 | 69 | 72 | 74 |

(Preparation of Glass Particles)

First, glass particles No. 1 to No. 5 were obtained by melting mixed raw materials so as to have glass compositions shown in Table 1, followed by grinding and classification.

The softening point is a temperature at a fourth inflection point measured by a macro differential thermal analyzer (DTA).

The density is a value measured by an Archimedes method.

The thermal expansion coefficient is a value measured in a temperature range of 30° C. to 300° C. by a thermome-chanical analyzer (TMA).

<First Experiment>

Table 2 shows examples (samples A to E) and a comparative example (sample F) according to a first experiment of the present invention.

TABLE 2

|  |  | Sample A | Sample B | Sample C | Sample D | Sample E | Sample F |
|---|---|---|---|---|---|---|---|
| Paste viscosity | Pa · s | 75 | 70 | 78 | 70 | 80 | 89 |
| Curable resin | Type | Acrylic | Acrylic | Acrylic | Acrylic | Acrylic | Acrylic |
| Inorganic particles | Content (vol %) | 45 | 45 | 45 | 45 | 45 | 45 |
| Ceramic particles | Type | Alumina | Alumina | Alumina | Alumina | Alumina | Alumina |
|  | Content (vol %) | 42.75 | 42.75 | 42.75 | 42.75 | 42.75 | 45 |
|  | Average particle size | 0.18 | 0.18 | 0.18 | 0.18 | 0.18 | — |
|  | Maximum particle size | 0.9 | 0.9 | 0.9 | 0.9 | 0.9 | — |
| Glass particles (vol %) | Type | No. 1 | No. 2 | No. 3 | No. 4 | No. 5 | — |
|  | Content (vol %) | 2.25 | 2.25 | 2.25 | 2.25 | 2.25 | 0 |
|  | Average particle size | 1.6 | 1.7 | 1.5 | 1.6 | 1.3 | — |
|  | Maximum particle size | 7 | 7 | 7 | 7 | 7 | — |
| Glass particles/(Glass particles + ceramic particles) | Volume ratio | 0.05 | 0.05 | 0.05 | 0.05 | 0.05 | 0 |
| Glass particles $D_{50}$/ Ceramic particles $D_{50}$ | Average particle size ratio | 8.89 | 9.44 | 8.33 | 8.89 | 7.22 | — |
| Cracks in three-dimensional shaped object |  | A | A | A | A | B | C |

(Preparation of Curable Resin)

An acrylic based photo-curable resin was prepared as a curable resin.

First, isophorone diisocyanate, morpholine acrylamide, and dibutyltin dilaurate were heated in an oil bath. A solution in which methylhydroquinone was uniformly mixed and dissolved in glycerin monomethacrylate monoacrylate was added, stirred, mixed, and reacted. Next, a propylene oxide 4 mol adduct of pentaerythritol (a product obtained by adding 1 mol of propylene oxide to each of four hydroxy groups of pentaerythritol) is added and reacted to produce a reaction product containing a urethane acrylate oligomer and morpholine acrylamide.

To the obtained reaction product containing a urethane acrylate oligomer and morpholine acrylamide, morpholine acrylamide and dicyclopentanyl diacrylate were added. Further, 1-hydroxycyclohexyl phenyl ketone (photopolymerization initiator) was added to obtain a colorless transparent acrylic photocurable resin.

(Preparation of Three-Dimensional Shaped Object)

Alumina (thermal expansion coefficient: $70 \times 10^4$/° C., density: 3.95 g/cm²) as ceramic particles and various glass particles were added to an acrylic based photo-curable resin at a ratio shown in Table 2, kneaded by a planetary centrifugal mixer, and then defoamed by a three-roll mill to obtain a paste for ceramic 3D shaping in which the ceramic particles and the glass particles were dispersed. With respect to the paste for ceramic 3D shaping without adding glass particles, a paste for ceramic 3D shaping was obtained in the same manner as described above except that glass particles were not added.

The paste for ceramic 3D shaping obtained as described above was set in a 3D ceramic shaping device in which a φ35 mm circular board having fine pores with a pore diameter of 250 μm was read as a CAD drawing, and three-dimensional shaping was performed. First, a paste was applied onto a stage for shaping by a dispenser so that a thickness of a layer of the paste became 50 μm, spread by a squeegee, and then irradiated with an ultraviolet laser having a wavelength of 355 nm to form a cured layer having a desired pattern. After one layer of the cured layer was formed in this manner, an uncured paste was introduced onto the cured layer, an operation of stacking a new cured layer on the cured layer was repeated 26 times in the same manner, and then the uncured paste was removed to obtain a precursor of a three-dimensional shaped object having a thickness of 1.3 mm.

The obtained precursor was fired in an air atmosphere to degrease and sinter the precursor, thereby obtaining a three-dimensional shaped object as a fired body. A specific firing profile is as follows. First, the temperature was raised from room temperature to 600° C. at a rate of 0.2° C./min to perform degreasing, and then the temperature was raised to 1600° C. at a rate of 10° C./min. Subsequently, the temperature was kept at 1600° C. for 2 hours to sinter the ceramic particles and the glass particles, and then the temperature was lowered to room temperature at 10° C./min. Thus, a three-dimensional shaped object having pores as shown in FIG. 1 was obtained.

An appearance of the obtained three-dimensional shaped object was observed using a digital scope, and the presence or absence of a crack was confirmed. Digital scope photographs of samples A, E, and F are shown in FIGS. 2 to 4.

Figure 2:
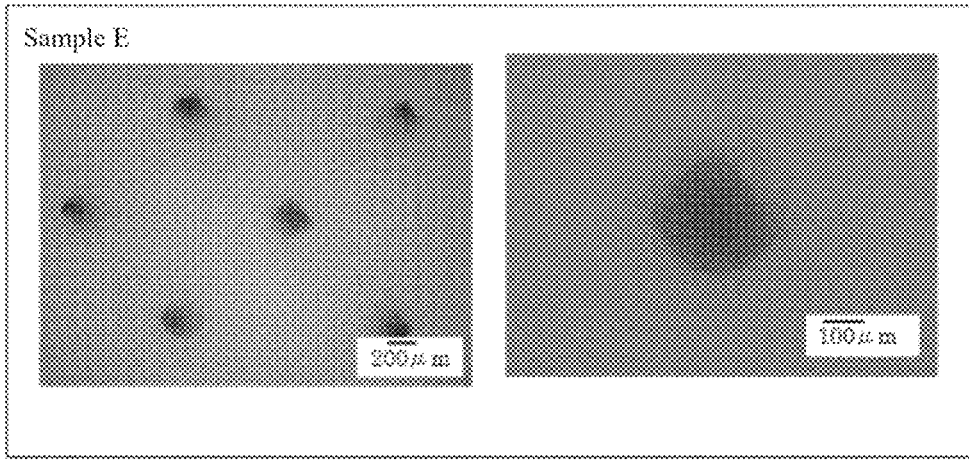
FIG. 2 is a digital scope photograph of a three-dimensional shaped object of a sample A.
Figure 3:
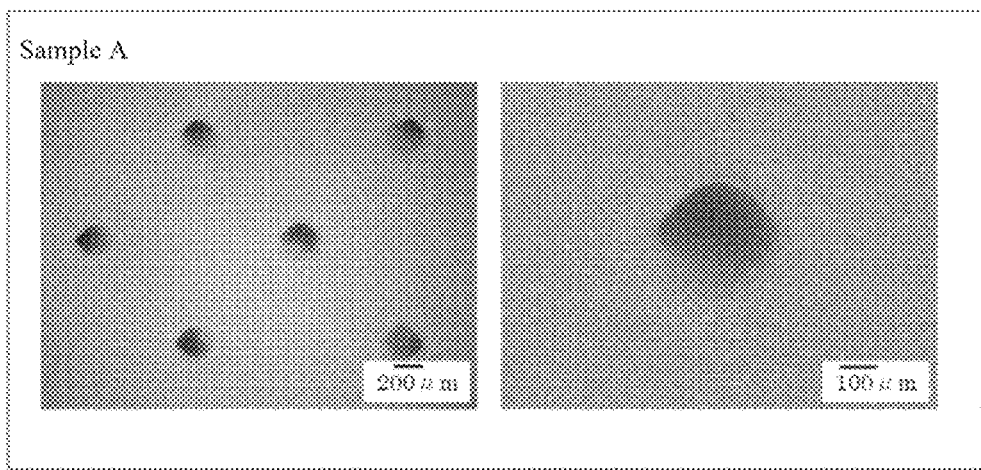
FIG. 3 is a digital scope photograph of a three-dimensional shaped object of a sample E.
Figure 4:
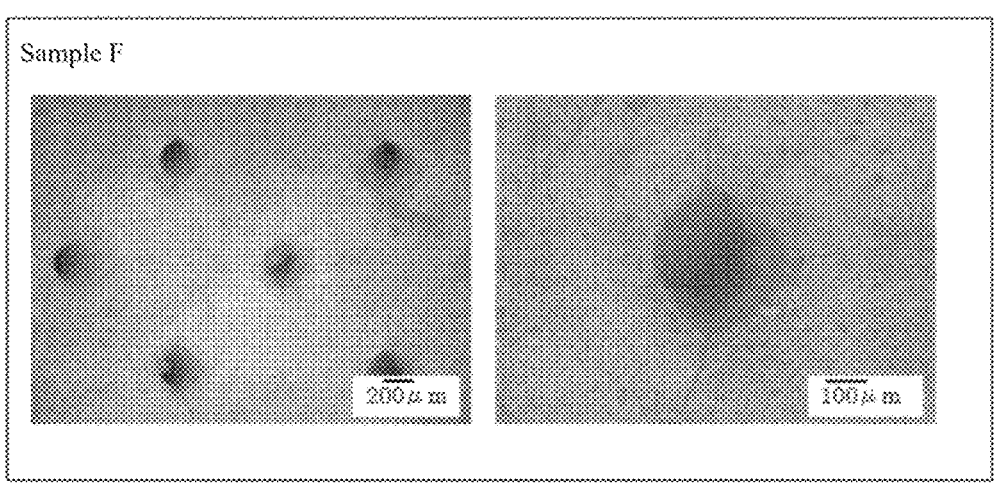
FIG. 4 is a digital scope photograph of a three-dimensional shaped object of a sample F.

As can be seen from Table 2 and FIGS. 2 to 4, no cracks were observed in samples A to E using the paste for ceramic 3D shaping containing glass particles according to the present invention. On the other hand, in a sample F using the paste for ceramic 3D shaping not containing glass particles, cracks were observed around the pores. In addition, when the sample was observed in more detail, a linear portion that could be a starting point of a crack was confirmed around the pore of the sample E.

<Second Experiment>

Table 3 shows examples (samples A and G) according to a second experiment of the present invention.

In the second experiment, three-dimensional shaped objects were produced in the same manner as in the first experiment, except that two different types of ceramic particles were used as ceramic particles in a paste for ceramic 3D shaping.

Alumina (thermal expansion coefficient: $70 \times 10^{-7}/°$ C., density: $3.95$ g/cm$^3$) as ceramic particles (1), titania (thermal expansion coefficient: $78 \times 10^{4}/°$ C., density: $4.2$ g/cm$^3$) as ceramic particles (2), and further glass particles were added to an acrylic based photo-curable resin at ratios shown in Table 3, kneaded by a planetary centrifugal mixer, and then defoamed by a three-roll mill to obtain a paste for ceramic 3D shaping in which the ceramic particles (1) and (2) and the glass particles were dispersed.

The paste for ceramic 3D shaping of the sample G obtained as described above was applied onto a stage for shaping by a dispenser and spread with a squeegee, and then irradiated in a cross shape with an ultraviolet laser of 355 nm (beam diameter 15 μm, output 5 mW), and a cured line width was measured by measuring a digital scope photograph. In order to confirm the effect due to the presence or absence of titania, the paste for ceramic 3D shaping of the sample A described in Table 2 was also evaluated by the same method as that of the sample G.

Figure 5:
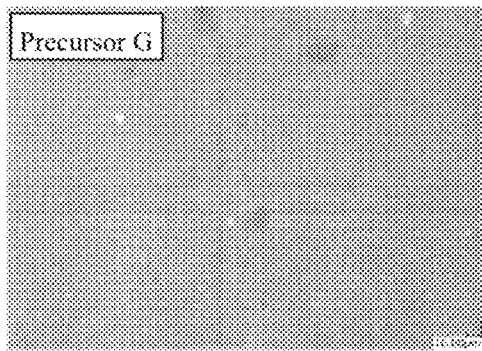
FIG. 5 is a digital scope photograph of a precursor of a sample G.
Figure 6:
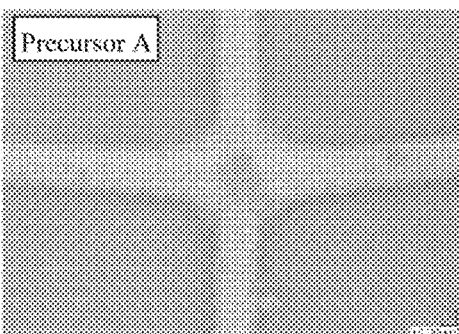
FIG. 6 is a digital scope photograph of a precursor of the sample A.

FIGS. 5 and 6 show digital scope photographs of the precursors with respect to the samples G and A after being irradiated with an ultraviolet laser of 355 nm (beam diameter: 15 m, output: 5 mW).

As can be seen from FIG. 5, the cured line width of the sample G containing titania was 15 μm while the beam diameter of the ultraviolet laser was 15 μm, and the irradiated portion with the ultraviolet laser was able to be precisely cured. On the other hand, the cured line width of the sample A containing no titania was 30 μm, and the sample A was cured to a range not irradiated with the ultraviolet laser. In addition, a thickness of the cured film obtained by irradiation with the laser having a beam diameter of 100 μm and an output of 10 mW was also confirmed. The thickness of the cured film of the sample G containing titania was as small as 30 μm, whereas the thickness of cured film of the sample A not containing titania was as large as 90 μm. Thus, it can be seen that when titania is contained as the ceramic

TABLE 3

| | | Sample A | Sample G |
|---|---|---|---|
| Paste viscosity | Pa · s | 75 | 75 |
| Curable resin | Type | Acrylic | Acrylic |
| Inorganic particles | Content (vol %) | 45 | 45 |
| Ceramic particles (1) | Type | Alumina | Alumina |
| | Content (vol %) | 42.75 | 42.75 |
| | Average particle size | 0.18 | 0.18 |
| | Maximum particle size | 0.9 | 0.9 |
| Ceramic particles (2) | Type | — | Titania |
| | Content (vol %) | — | 0.45 |
| | Average particle size | — | 0.15 |
| | Maximum particle size | — | Unmeasured |
| Glass particles (vol %) | Type | No. 1 | No. 1 |
| | Content (vol %) | 2.25 | 1.8 |
| | Average particle size | 1.6 | 1.6 |
| | Maximum particle size | 7 | 7 |
| Glass particles/(Glass particles + ceramic particles ((1) + (2))) | Volume ratio | 0.05 | 0.042 |
| Ceramic particles (2)/(Glass particles + Ceramic particles ((1) + (2))) | Volume ratio | — | 0.010 |
| Glass particles $D_{50}$/Ceramic particles $D_{50}$ | Average particle size ratio | 8.89 | — |
| Cracks in three-dimensional shaped object | | A | A |
| Cured line width (μm) φ 15, 5 mW | | 30 | 15 |
| Thickness of cured film (μm) φ 100, 10 mW | | 90 | 30 | particles, the range of curing by laser irradiation can be controlled also in a depth direction.

(Preparation of Three-Dimensional Shaped Object)

Next, a paste for ceramic 3D shaping of the sample G was set in a 3D ceramic shaping device in which a 10 mm square flat plate having pores with a pore diameter of 50 m was read as a CAD drawing, and three-dimensional shaping was performed. First, a paste was applied onto a stage for shaping by a dispenser so that a thickness of a layer of the paste became 40 μm, spread by a squeegee, and then irradiated with an ultraviolet laser of 355 nm to form a cured layer having a desired pattern. After one layer of the cured layer was formed in this manner, an uncured paste was introduced onto the cured layer, and an operation of stacking a new cured layer on the cured layer in the same manner was repeated twice, and then the uncured paste was removed to obtain a precursor of a three-dimensional shaped object having a thickness of 0.06 mm.

The obtained precursor was fired in an air atmosphere to degrease and sinter the precursor, thereby obtaining a three-dimensional shaped object as a fired body. A specific firing profile is as follows. First, the temperature was raised from room temperature to 600° C. at a rate of 0.2° C./min to perform degreasing, and then the temperature was raised to 1600° C. at a rate of 10° C./min. Subsequently, the temperature was kept at 1600° C. for 2 hours to sinter the ceramic particles and the glass particles, and then the temperature was lowered to room temperature at 10° C./min.

Figure 7:
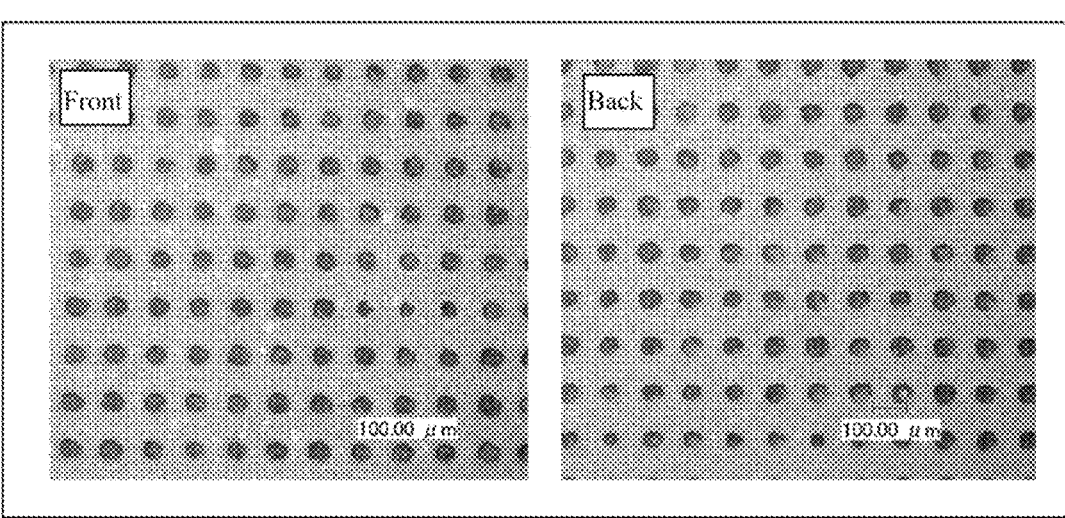
FIG. 7 is a digital scope photograph of a three-dimensional shaped object of a sample G.

As a result, a sheet-shaped three-dimensional shaped object having pores as shown in FIG. 7 was obtained. The resulting three-dimensional shaped object had a fine structure with a thickness of 40 μm, a pore diameter of 50 to 60 μm, and a pore pitch of 150 μm. The paste for ceramic 3D shaping containing titania can strictly regulate a portion to be cured by an ultraviolet laser due to an ultraviolet absorbing effect of titania, and a three-dimensional shaped object having a fine structure can be easily obtained. An appearance of the resulting three-dimensional shaped object was observed using a digital scope to confirm the presence or absence of a crack, and no crack was observed.

<Third Experiment>

Further, as a third experiment, Examples (C-1 to C-3) and Comparative Examples (C-4 to C-6) are shown in Table 4.

A three-point bending strength test was performed by using a three-point bending strength tester in accordance with JIS R-1601, which is a bending test method for fine ceramics.

As can be seen from C-4 to C-6 in Table 4, in the test piece using the sample F not containing glass particles, the three-point bending strength was decreased when the firing temperature was lowered. This is considered to be due to insufficient sintering of the alumina particles.

On the other hand, the three-point bending strength of the test pieces C-1 to C-3 using the sample A containing the glass particles was not decreased. The reason for this is considered that, in the test piece of the sample A containing glass particles, some reaction occurred at the interface between the alumina particles and the glass particles even in a temperature range of less than 1600° C., and thus the strength was not decreased due to the presence of the reaction product. Specifically, in the case of C-1 to C-3, it is presumed that as a result of the reaction between the alumina particles in the sample A and ZnO in the glass composition of the glass particles (No. 1), a crystal of gahnite ($ZnAl_2O_4$) was precipitated and the presence of the crystal in the gap between the alumina particles maintained the strength.

The invention claimed is:

1. A paste for ceramic 3D shaping comprising:
a curable resin and
inorganic particles,
wherein the inorganic particles comprise ceramic particles and glass particles,
wherein the ceramic particles comprise titanium-oxide based ceramic particles,
wherein an average particle diameter of the ceramic particles is 0.01 μm to 0.49 μm, and
wherein the titanium-oxide based ceramic particles/(the ceramic particles+the glass particles) is, in volume ratio, 0.001 to 0.1.

2. The paste for ceramic 3D shaping according to claim 1, wherein the glass particles/(the ceramic particles+the glass particles) is, in volume ratio, 0.01 to 0.5.

3. The paste for ceramic 3D shaping according to claim 1, wherein a content of the inorganic particles is 15 vol % or more.

TABLE 4

|  | C-1 | C-2 | C-3 | C-4 | C-5 | C-6 |
|---|---|---|---|---|---|---|
| Paste for ceramics 3 D shaping | Sample A | Sample A | Sample A | Sample F | Sample F | Sample F |
| Firing temperature (° C.) | 1600 | 1550 | 1500 | 1600 | 1550 | 1500 |
| Three-point bending strength (MPa) — Average (n = 10) | 424 | 413 | 439 | 441 | 354 | 289 |
| Three-point bending strength (MPa) — Average strength ratio (vs. firing at 1600° C.) | 1.00 | 0.97 | 1.04 | 1.00 | 0.80 | 0.66 |

In the third experiment, a firing temperature and a three-point bending strength of a three-dimensional shaped object were investigated using pastes for ceramic 3D shaping of the samples A and F. The third experiment was performed in the same manner as in the first experiment except that the paste for ceramic 3D shaping described in Table 4 was used, and the obtained precursor was heated to the temperature described in Table 4 and sintered to obtain a three-dimensional shaped object having a columnar shape of 3×4×40 mm. Ten pieces of each of three-dimensional shaped objects C-1 to C-6 were prepared as test pieces, and a three-point bending strength test was performed.

4. The paste for ceramic 3D shaping according to claim 1, wherein a content of the ceramic particles is 10 vol % or more.

5. The paste for ceramic 3D shaping according to claim 1, wherein the glass particles have a softening point of 550° C. to 1200° C.

6. The paste for ceramic 3D shaping according to claim 1, wherein a glass composition of the glass particles comprises, in mass %, 10% to 60% of $SiO_2$, 0 to 15% of $Al_2O_3$, 0 to 50% of $B_2O_3$, 0 to 40% of ZnO, 0 to 30% of BaO, 0 to 25% of CaO, 0 to 20% of SrO, 0 to 7% of $Na_2O$, 0 to 2% of $K_2O$, 0 to 5% of $P_2O_5$, 0 to 3% of ZrO, and 0 to 5% of $F_2$.

7. The paste for ceramic 3D shaping according to claim 1, wherein the curable resin is a photo-curable resin.

8. A method for manufacturing a three-dimensional shaped object using the paste for ceramic 3D shaping according to claim 1, the method comprising:

irradiating the paste for ceramic 3D shaping with an active energy ray to cure the curable resin to obtain a precursor; and heat-treating the precursor to remove the curable resin and sintering the ceramic particles and the glass particles.

9. The paste for ceramic 3D shaping according to claim 1, wherein the titanium-oxide based ceramic particles comprises at least one of titania, barium titanate, and strontium titanate.

* * * * *